United States Patent
Banyas et al.

[11] Patent Number: 6,119,627
[45] Date of Patent: Sep. 19, 2000

[54] RODENT REPELLING BIRD FEEDER

[76] Inventors: Michael Banyas, 5579-B Chamblee Dunwoody Rd., Suite 136, Atlanta, Ga. 30338; Paul L. Artigues, 3040 Sumitwood Dr., Kennesaw, Ga. 30144

[21] Appl. No.: 09/185,452

[22] Filed: Nov. 3, 1998

[51] Int. Cl.[7] .................................................. A01K 39/00
[52] U.S. Cl. ........................................ 119/57.9; 119/52.3
[58] Field of Search ................... 119/57.9, 52.2, 119/52.3, 52.4, 57.8

[56] References Cited

U.S. PATENT DOCUMENTS

| | | | |
|---|---|---|---|
| 3,678,901 | 7/1972 | Dulle | 119/537 |
| 3,911,866 | 10/1975 | Dodd | 119/537 |
| 4,038,639 | 7/1977 | Kuebler | 340/573 |
| 4,185,581 | 1/1980 | Tilton | 116/22 A |
| 5,297,503 | 3/1994 | Hibbard . | |
| 5,309,867 | 5/1994 | Cruz . | |
| 5,392,732 | 2/1995 | Fry . | |
| 5,471,951 | 12/1995 | Collins . | |
| 5,676,089 | 10/1997 | Morganson . | |
| 5,690,056 | 11/1997 | Korb . | |
| 5,720,238 | 2/1998 | Drakos . | |

*Primary Examiner*—Peter M. Poon
*Assistant Examiner*—Yvonne R. Abbott
*Attorney, Agent, or Firm*—Hinkle & Associates, P.C.

[57] ABSTRACT

A cylindrical rodent repelling bird feeder 11 having an annular perch 13 around the feeder and an electric motor 33 geared to the perch. The perch is coupled to the electric motor and the electric motor is reciprocatively mounted in the bird feeder so that when a rodent 47 of excessive weight alights upon the perch the motor is pulled against a resistance spring 41 and a switch 38 is caused to close, thereby engaging the motor which rotates the perch to dislodge the rodent therefrom.

20 Claims, 3 Drawing Sheets

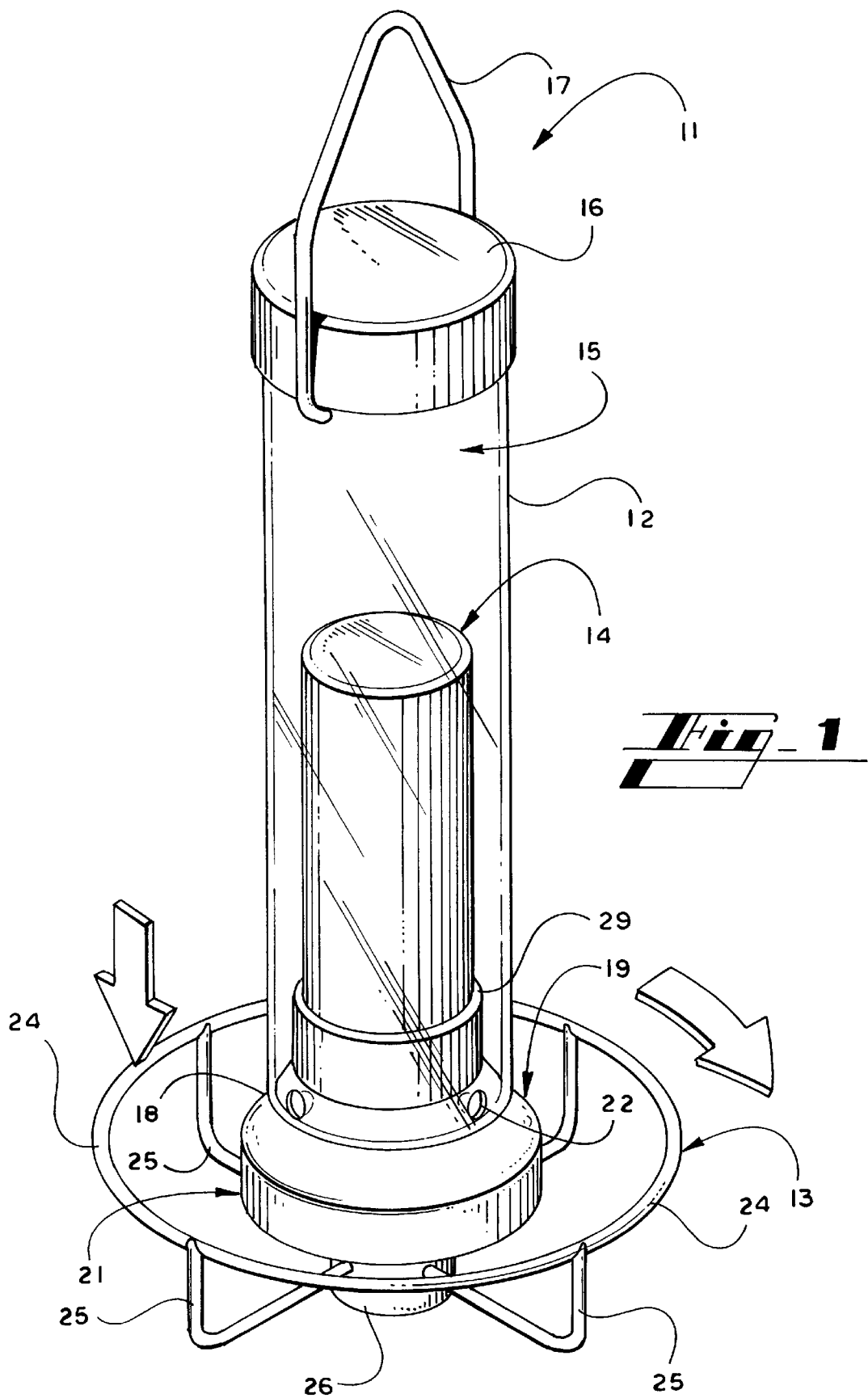
Fig_1

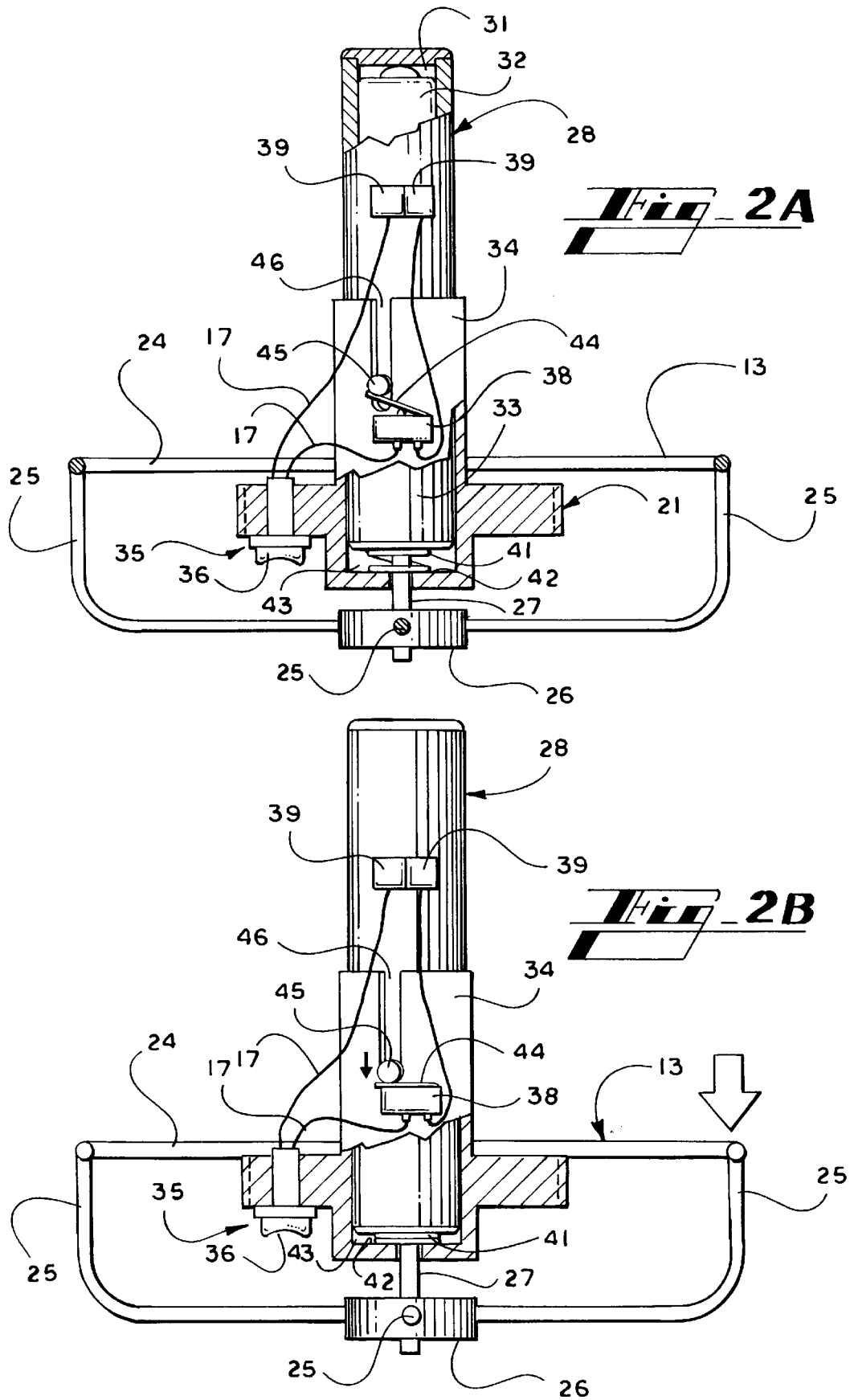

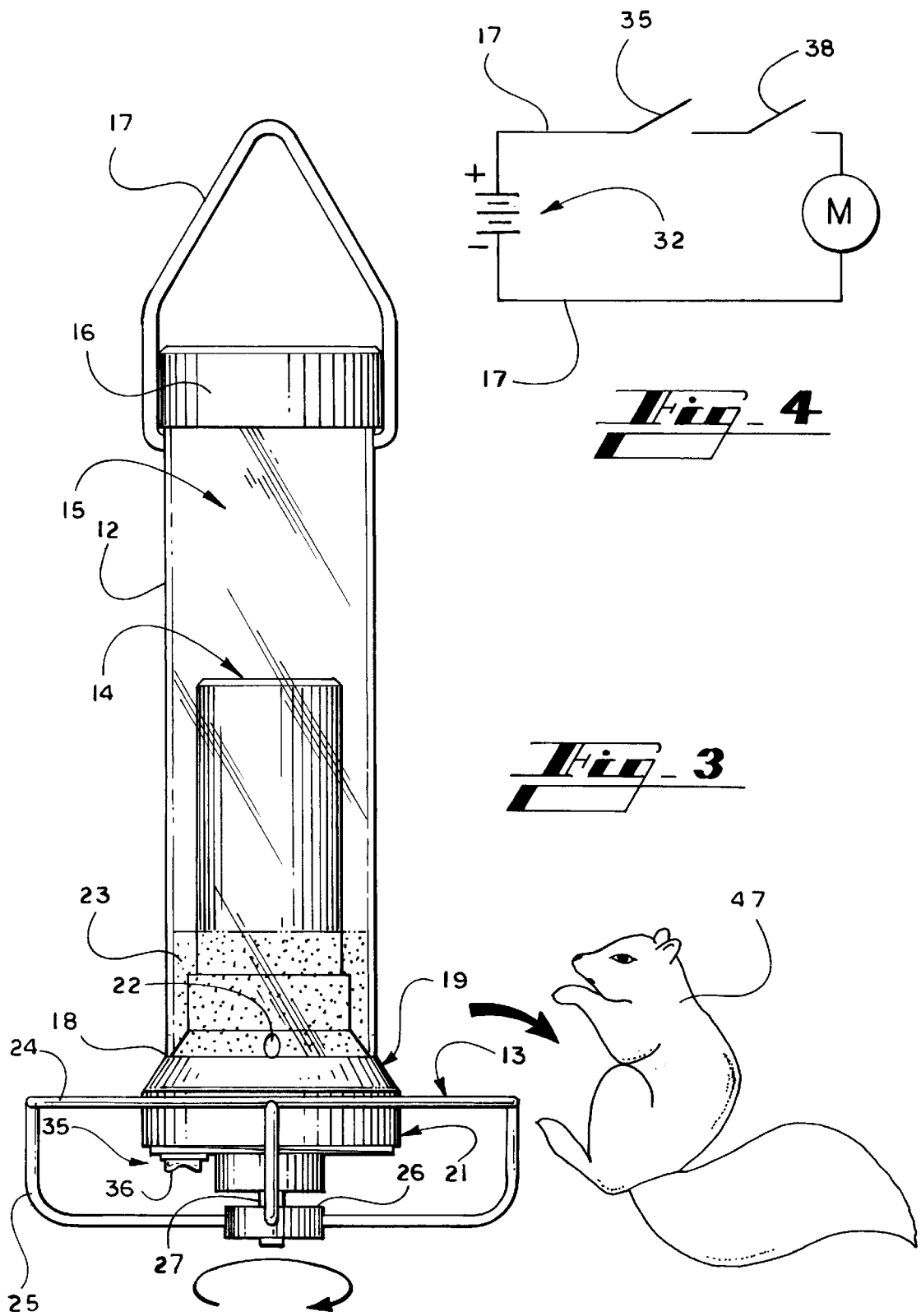

RODENT REPELLING BIRD FEEDER

BACKGROUND OF THE INVENTION

I. Field of the Invention

The present invention relates generally to the field of song bird feeders and, more particularly, to bird feeders which prevent unwanted animals, rodents and birds from feeding at the feeder. The feeder of the present invention also provides a great deal of amusement to those watching when an unwanted rodent alights on the feeder.

Bird watching is a fulfilling activity for many and provides an educational tool for children in that it increases environmental consciousness. Further, bird feeders assist certain species of birds to find foods and supplements to augment their diets, especially during periods of severe weather.

II. Description of the Related Art

Not only are there many bird feeders of unlimited designs, there are also bird feeders which have been designed to prevent unwanted animals, rodents and birds from invading and eating from bird feeders which have been designed for the typical lightweight song bird.

The prior art has disclosed many devices which offer discouragement or removal of unwanted pests at the song bird feeder. For instance, there are a great number of known bird feeders which have weight sensitive, tiltable perches for dislodging the unwanted pest, such as shown in the patents to Loken (U.S. Pat. No. 5,105,765), Wessner (U.S. Pat. No. 5,048,461) and Dehls (U.S. Pat. No. 4,541,362).

There are many electrical type devices which will shock unwanted pests which alight on a song bird feeder, such as is shown in Fry (U.S. Pat. No. 5,392,732) and Collins (U.S. Pat. No. 5,471,951).

Many weight sensitive devices have been shown wherein the food openings in the bird feeder will close if an animal heavier than the normal song bird, sits on the perch near the food opening. The patent to Drakos (U.S. Pat. No. 5,720,238) is typical of this type of mechanism.

There are also devices which sense an animal, such as a squirrel or heavy unwanted bird, which will, at a predetermined point in time, effectively remove the unwanted pest from the feeder. Typical of these prior devices, is the patent to Hibbard (U.S. Pat. No. 5,297,503) and Korb (U.S. Pat. No. 5,690,056). It is this latter type of bird feeder to which the present invention pertains.

SUMMARY OF THE INVENTION

In accordance with the present invention and the contemplated problems which have existed, and continue to exist in this field, the objectives of this invention include providing a rodent proof song bird feeder. The feeder of the present invention is electrical in nature and includes a food containing housing having a suitably constructed electric motor and gearing mechanism driven by battery power which will rotate a feeding perch at such time as an unwanted pest alights upon the perch.

This invention has a calibrated resistance spring affixed between the perch mechanism and a switch which controls the electric motor so that if the unwanted pest alights on the feeding perch, the feeding perch will move so that a contact operates the electrical switch to cause the electrical motor and gearing mechanism to rotate the perch, and the centrifugal force generated by the rotation of the perch is sufficient to throw the rodent from the perch, much to the amusement of all watching and much to the disdain of the pest.

Other objects, advantages and capabilities of the invention will become apparent from the foregoing description taken in conjunction with the accompanying drawings showing the preferred embodiment of the invention.

BRIEF DESCRIPTION OF THE DRAWINGS

FIG. 1 is an overall perspective view of the bird feeder of the present invention;

FIG. 2A is a partial vertical elevation view of the operable parts of the invention partially in section showing the electrical switch in an off position;

FIG. 2B is a partial vertical elevation view of the operable parts of the invention partially in section showing the switch in a closed on position indicating the perch is rotating;

FIG. 3 is an elevation view showing the perch rotating and throwing a squirrel therefrom; and FIG. 4 is a basic circuit diagram of the electric motor system of the invention.

DESCRIPTION OF THE PREFERRED EMBODIMENT

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIGS. 1 and 3. The bird feeder of the present invention is generally indicated by the numeral 11, and comprises a transparent feeder body 12, a perch 13 and a motor enclosure 14. The feeder body 12 comprises an elongated tubular, transparent member 15 which is open at both ends. At the distal end thereof, a removable feed charging cap 16 covers the distal end so that the feeder body member 15 may be accessed by the user in order to fill it with bird feed. Also at the distal end, there is a hanger 17 of suitable design for hanging the bird feeder from any support which the user desires to accommodate the bird feeder.

The proximal end 18 of the feeder body member 15 generally rests upon the downwardly sloping surface of the housing base 19. The proximal end 18 is suitably attached to the housing base 19, preferably by an adhesive which will be compatible with the transparent feeder body member 15 and with the material out of which the housing base 19 is made. For purposes of long life, the parts of the exterior housing components of the present invention will be made of plastic materials. Directly underneath the housing base 19 is the motor housing base 21 which is typically a molded plastic member which houses the motor drive and drive mechanism of the present invention, to be later described herein.

At the proximal end 18 of the tube, there are positioned around the base of the tube a plurality of feeding cavities 22 which may be of any reasonable design, but, for the purposes herein, are shown as round openings. The purpose of the feeding cavities is to allow the bird feed 23 to be accessed by the song birds which alight upon the perch 13. As is well known, bird feed in a container such as shown herein will not normally freely flow through the feeding cavities 22, but will typically be maintained within the feeder body member 15 due to interaction between the various grains of the food and the friction caused between the interaction. Therefore, the food normally stays within the feeder body member 15 until a song bird pecks at the food to allow the food to feed through the cavities 22 at a controlled rate.

The perch 13 is maintained in operable relation with respect to the bird feeder 11, and sufficiently distanced from the motor mounting base 21 by its configuration and mounting mechanism. The perch 13 generally comprises an annular perch rim 24 which is supported by a plurality of perch supports 25. The free ends of the perch supports 25 are then mounted in the motor and perch coupling member 26 which is suitably attached to the motor output shaft 27. Obviously, the perch 13 could be of any reasonable configuration, but it has been found that the annular configuration shown herein most nearly matches the circular configuration of the transparent feeder body 12 and housing base 19, and will more nearly balance the unit in operation.

The main operative portion of the invention resides in the motor enclosure 14 which houses the motor housing 28 (see FIGS. 2A and 2B). The enclosure 14 is telescopically engaged in the housing sleeve 29 which is firmly affixed to base 19. Within the motor housing 28, is a battery compartment 31 for housing one or more suitable dry cell batteries 32 which will drive a suitable D.C. electric motor turning a gear reduction unit. The motor and gear reduction unit are not specifically detailed in the drawings, inasmuch as these types of units are quite common in the electrical arts and it is believed that the same need not be specifically described. The motor and gear reduction units would be housed together in the proximal end 33 of the motor housing 28, all of which is in the same cylindrical motor enclosure 14.

The motor enclosure 14 generally fits around the motor and battery housing 28 which is telescopically engaged with the motor and battery compartment support 34, which support is in turn an upstanding portion of the motor mounting base 21. The support 34 allows the motor housing 28 to be fully telescopically involved with the support 34 for both operational capabilities and for maintenance reasons.

At the bottom exterior surface of the motor mounting base 21, there is a user activated control off-on switch 35 comprising a contact switch button 36 which will enable the user to turn the electrical performance features of the bird feeder on or off at will. The switch 35 is wired through suitable wiring 37 to a lever activated motor switch 38, which will energize the electrical motor through suitable contacts 39 which will couple the motor to the batteries for energization. The lever switch 38, such as described herein, is common in the electrical industries and may be purchased to have various operating weights which need to be overcome before the switch is fully activated.

At the proximal end 33 of the motor and battery housing 28 is a calibrated resistance spring 41 mounted around motor shaft 27 and positioned between the end portion 33 and the bottom surface 42 of the cavity 43 within motor mounting base 21. As seen in FIG. 2A showing the bird feeder 11 at a "rest" position, cavity 43 is at its maximum size because there is no weight upon the perch 13. Should the weight upon perch 13 be such to indicate the presence of an unwanted rodent or other pest, the overweight on the perch then causes the entire motor and battery housing 28 to reciprocate downwardly to compress resistance spring 41 to a position shown in FIG. 2B. To energize the motor to rotate the perch 13, the motor switch 38 is closed when switch lever 44 moves downwardly due to the force of the switch contactor 45, which contactor 45 is permanently and fixedly mounted in motor and battery housing 28. The switch contactor 45 projects through and within the longitudinally disposed guide slot 46 which maintains the motor and battery housing 28 in a fixed position with respect to motor mounting base 21 to prevent all elements from rotating simultaneously. When switch contactor 45 is positioned at its most downward position, the switch lever 44 is positioned at its maximum extent and closes switch 38 to energize the motor.

In operation of the present invention, when a pest such as a squirrel 47 alights upon the perch 13, the weight of the squirrel thereon will cause the weight of the squirrel to be transferred to the perch 13 such that it overcomes the precalculated resistance of spring 41, and ultimately be transferred to the motor and perch coupling 26 which will, in turn, reciprocate the motor and battery housing 28 downwardly within the support 34 by acting up on the motor output shaft 27. As the weight of the squirrel 47 is greater than the calibrated resistance of spring 41, the motor and battery housing 28 will move downwardly causing switch contactor 45 to depress switch lever 44 thereby closing switch 38 and energizing the electric motor which will rotate motor output shaft 27 and the perch 13 causing the squirrel 47 to be dislodged and propelled from the perch to the great delight of those watching, and to the consternation of the squirrel. Once the pest has been dislodged from the perch, the weight is reduced thereupon and, consequently, the resistance spring 41 then pushes the motor and battery housing 28 back into the rest position which will cause the switch contactor 45 to release switch lever 44 and to de-energize the electric motor.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A rodent-proof bird feeder for feeding birds, the feeder comprising:
    a feed holding container,
    a housing base upon which the feed holding container is mounted;
    electric motor having an output shaft, a motor mounting base juxtaposed to the housing base, the motor being mounted in the motor mounting base for reciprocative movement therewith;
    a power supply for powering the electric motor;
    a perch, the perch having coupling means coupling the perch to the electric motor output shaft;
    the coupling means including a resistance biasing means supporting the motor on the motor mounting base; and
    a switch means for energizing the motor, a switch contactor integral with the electric motor, the switch contactor energizing the switch means at predetermined times when the weight of an undesired animal upon the perch overcomes the resistance of the biasing means causing the electric motor to reciprocate within the motor mounting base and to compress the resistance biasing means to thereby rotate the output shaft and the coupled perch.

2. A rodent-proof bird feeder for feeding birds as claimed in claim 1, comprising the motor being mounted within the tubular motor support for reciprocal movement therein.

3. A rodent-proof bird feeder for feeding birds as claimed in claim 2, comprising the motor mounting base having an open cavity at the proximal end thereof forming a recess into which the resistance biasing means is maintained.

4. A rodent-proof bird feeder for feeding birds as claimed in claim 3, comprising a tubular motor support having a proximal end and a distal end, the proximal end being integral with the motor mounting base, the tubular motor support projecting perpendicularly from the motor mounting base.

5. A rodent-proof bird feeder for feeding birds as claimed in claim 4, comprising the distal end of the tubular motor support having a longitudinally disposed slot therein.

6. A rodent-proof bird feeder for feeding birds as claimed in claim 1, comprising the perch being annular and surrounding the bird feeder.

7. A rodent-proof bird feeder for feeding birds as claimed in claim 6, comprising the perch having a rim being supported by the perch coupling means, the perch coupling means comprising rim supports and a coupling member, the rim supports being fixed between the perch rim and the coupling member, the coupling member being fixed to the motor output shaft.

8. A rodent-proof bird feeder for feeding birds as claimed in claim 1, comprising the switch contactor being reciprocatively placed in a longitudinally disposed slot of the distal end of a tubular motor support.

9. A rodent-proof bird feeder for feeding birds as claimed in claim 8, comprising the switch means being positioned on the tubular motor support between the distal end and the proximal end of the tubular motor support.

10. A rodent-proof bird feeder for feeding birds as claimed in claim 9, comprising the switch means having a movable lever arm, the lever arm being mounted to receive the switch contactor, the switch means energizing the electric motor when the switch contactor moves the lever arm a predetermined distance.

11. A rodent-proof bird feeder for feeding birds as claimed in claim 1, comprising the feed holding container having a plurality of feed dispensing cavities therein.

12. A rodent-proof bird feeder for feeding birds as claimed in claim 11, comprising the feed holding container having a proximal end and a distal end, the proximal end being mounted on the housing base, the distal end having a removable feed charging cap closing the distal end.

13. A rodent-proof bird feeder for feeding birds as claimed in claim 12, comprising the feed holding container being transparent.

14. A rodent-proof bird feeder for feeding birds as claimed in claim 1, comprising a control electric switch electrically connected in-line between the power supply and the switch means.

15. A rodent-proof bird feeder for feeding birds, the feeder comprising:
- a feed holding container,
- a housing base upon which the feed holding container is mounted;
- electric motor having an output shaft, a motor mounting base juxtaposed to the housing base, the motor being mounted in the motor mounting base for reciprocative movement therewith;
- the motor means being mounted within a tubular motor support for reciprocal movement therein, the motor mounting base having an open cavity at the proximal end thereof forming a recess into which a resistance biasing means is maintained;
- the tubular motor support having a proximal end and a distal end, the proximal end being integral with the motor mounting base, the tubular motor support projecting perpendicularly from the motor mounting base, the distal end of the tubular motor support having a longitudinally disposed slot therein;
- a power supply for powering the electric motor;
- a perch, the perch having coupling means coupling the perch to the electric motor output shaft;
- the coupling means including the resistance biasing means supporting the motor on the motor mounting base;
- the perch being annular and surrounding the bird feeder, the perch having a rim being supported by the perch coupling means, the perch coupling means comprising rim supports and a coupling member, the rim supports being fixed between the perch rim and the coupling member, the coupling member being fixed to the motor output shaft;
- a switch means for energizing the motor, a switch contactor integral with the electric motor, the switch contactor energizing the switch means at predetermined times when the weight of undesired animal upon the perch overcomes the resistance of the biasing means causing the electric motor to reciprocate within the motor mounting base and to compress the resistance biasing means to thereby rotate the output shaft and the coupled perch.

16. A rodent-proof bird feeder for feeding birds as claimed in claim 15, comprising the switch contactor being reciprocatively placed in the longitudinally disposed slot of the distal end of the tubular motor support.

17. A rodent-proof bird feeder for feeding birds as claimed in claim 16, comprising the switch means being positioned on the tubular motor support between the distal end and the proximal end of the tubular motor support.

18. A rodent-proof bird feeder for feeding birds as claimed in claim 17, comprising the switch means having a movable lever arm, the lever arm being mounted to receive the switch contactor, the switch means energizing the electric motor when the switch contactor moves the lever arm a predetermined distance.

19. A rodent-proof bird feeder for feeding birds as claimed in claim 18, comprising the feed holding container having a plurality of feed dispensing cavities therein.

20. A rodent-proof bird feeder for feeding birds as claimed in claim 19, comprising:
- the feed holding container having a proximal end and a distal end, the proximal end being mounted on the housing base, the distal end having a removable feed charging cap closing the distal end; and
- a control electric switch electrically connected in-line between the power supply and the switch means.

* * * * *